United States Patent [19]

Lemon

[11] Patent Number: 4,459,208
[45] Date of Patent: Jul. 10, 1984

[54] FILTER SYSTEM FOR A POWER TRANSMITTING DEVICE

[75] Inventor: Robert W. Lemon, Farmington Hills, Mich.

[73] Assignee: Rockwell International Corporation, Pittsburgh, Pa.

[21] Appl. No.: 339,036

[22] Filed: Jan. 13, 1982

[51] Int. Cl.$^3$ .................. B01D 35/14; B01D 27/10; B01D 27/08

[52] U.S. Cl. .................. 210/168; 210/131; 210/171; 210/232; 210/416.5; 184/6.12; 184/6.24; 74/801

[58] Field of Search ............. 210/130, 131, 168, 232, 210/238, 416.5, 435, 437, 452, 171; 184/6.12, 6.24; 74/801

[56] References Cited

U.S. PATENT DOCUMENTS

| | | | |
|---|---|---|---|
| 1,134,275 | 4/1915 | Kelly | 210/131 |
| 1,203,290 | 10/1916 | Weiland | 210/168 |
| 1,506,967 | 9/1924 | Bosworth | 210/131 |
| 1,846,072 | 2/1932 | Whyte | 184/6.24 |
| 1,947,222 | 2/1934 | Nivan | 184/6.24 |
| 2,331,119 | 10/1943 | Gouldbourn | 210/168 |
| 2,447,144 | 8/1948 | Thornton | 210/168 |
| 2,492,831 | 12/1949 | Banker | 74/801 |
| 2,747,743 | 5/1956 | Talak | 210/130 |
| 3,502,176 | 3/1970 | Terry | 210/168 |
| 3,550,724 | 12/1970 | Vollmer | 184/6.12 |

*Primary Examiner*—Ernest G. Therkorn

[57] ABSTRACT

A filter system is for a power transmitting device which has an oil pump to draw lubricating oil through an oil passage from an oil sump in the housing thereof. A chamber is provided in the housing to intersect the oil passage and is partially below the normal level of the lubricating oil in the oil sump. A filter device is installed in the chamber for filtering the lubricating oil. An access cover for the chamber is above the normal level of lubricating oil to allow installation, removal and inspection of the filter and verification of the lubricating oil level.

3 Claims, 1 Drawing Figure

FILTER SYSTEM FOR A POWER TRANSMITTING DEVICE

BACKGROUND OF THE INVENTION

1. Field of the Invention

This invention relates to a filter system for a power transmitting device and, more specifically, to such a filter system which allows installation and removal of the filter thereof without removing the lubricating oil in the oil sump of the power transmitting device while verifying the level of the lubricating oil in the sump.

2. Description of the Prior Art

With the advent of heavy duty trucks for on-highway and off-highway use, there has been a continued emphasis in providing positive pressure lubricating systems for power transmitting devices used in such vehicles. With the increase in positive pressure lubricating systems, there has also been an increase in the number of such systems which utilize filters to insure the satisfactory quality of the lubricating oil. While some of these filter devices are mounted externally of the power transmitting device housing, there are others which are installed internally.

Generally, U.S. Pat. Nos. 2,492,831; 2,498,828; 2,896,479 and 3,550,724 disclose internally installed filter systems which might be applicable for the power transmitting devices found on such trucks. However, in some of these systems, the filters cannot be inspected or removed for cleaning without removal of all of the lubricating oil stored within the power transmitting device. Additionally, the method of flow through the filters disclosed therein would result in the entrapment of undesired particles externally of the filter making it more likely that the particles to be withdrawn from the system might accidently be left in the lubricating system when the filter is removed.

In any case, there remains a need for providing a filter system for a power transmitting device which will allow easy access to the filter for its inspection and removal.

SUMMARY OF THE INVENTION

It is, therefore, an object of this invention to provide a filter system for a power transmitting device which is reliable, inexpensive and facilitates easy access to the filter for its inspection and removal.

Theses and other objects of the invention are provided in a preferred embodiment thereof including a lubricating system for a power transmitting device of the type which includes a housing, an oil sump in a lower region of the housing for retention of a supply of lubricating oil which is to be maintained at a predetermined level when the power transmitting device is not in use, an oil pumping means and an internal oil passage from the oil sump to the inlet of the oil pumping means. The filter system includes a chamber in the housing which intersects the oil passage and is located at least partially below the predetermined level of the lubricating oil. A filter means is removably installed in the chamber for filtering the lubricating oil flowing through the oil passage. The chamber has an opening in the housing to allow access thereto which is above the predetermined level to allow installation and removal of the filter means, verification of the lubricating oil at the predetermined level and supply of the lubricating oil to the predetermined level if needed. There is included a removable means for sealed closure of the opening.

DETAILED DESCRIPTION OF THE PREFERRED EMBODIMENT

Figure 1:
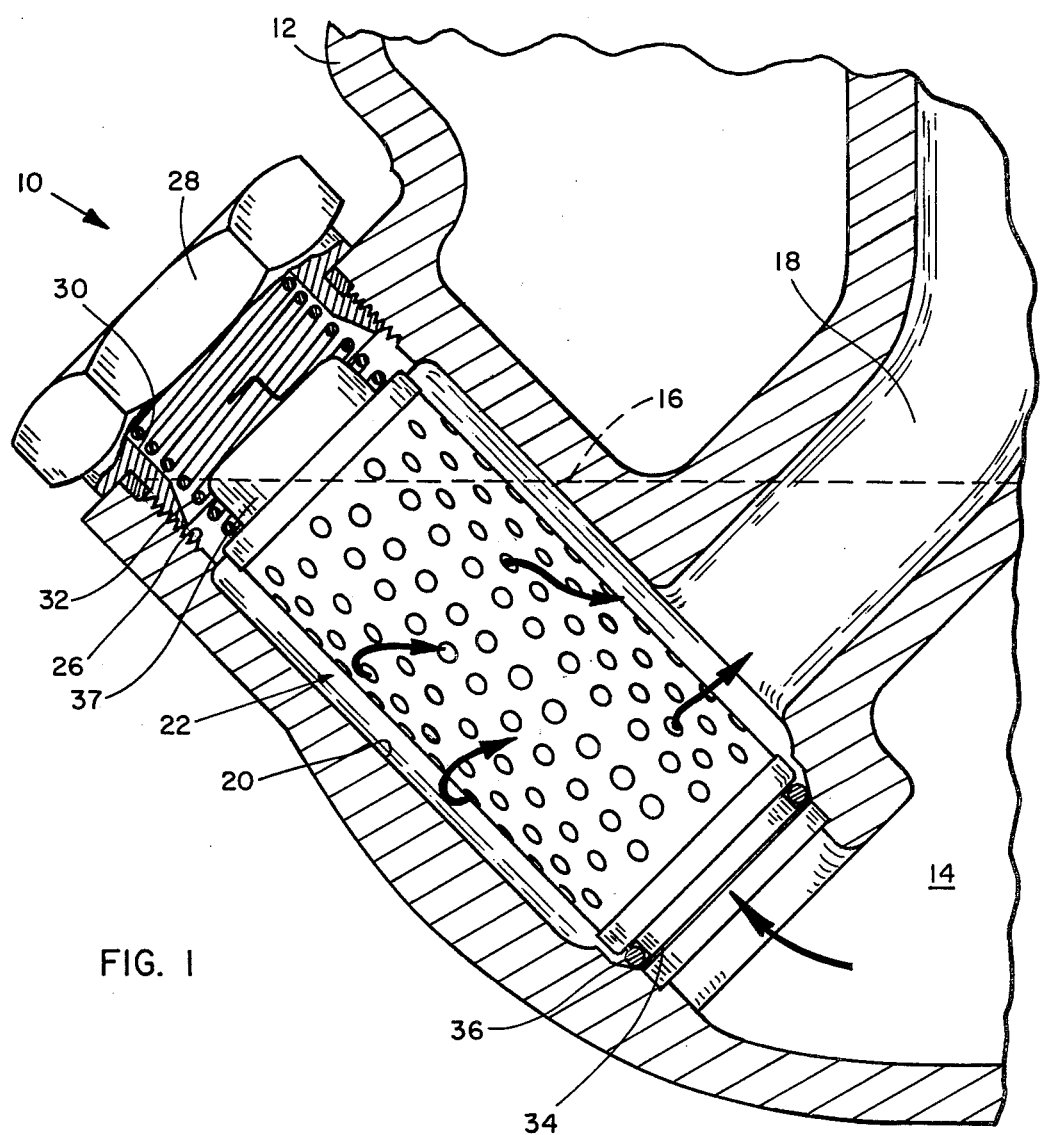
FIG. 1 is a sectional side view of the preferred filter system including various features of the invention.

As seen in FIG. 1, a filter system 10 is located in a housing 12 of a power transmitting device such as a transmission, transfer case, gear reducer, interaxle differential or the like. The housing 12 includes an oil sump 14 which is located in a lower region thereof to include a supply of lubricating oil. It is not uncommon for the operating instructions for such power transmitting devices to includes a desired predetermined level 16 for the lubricating oil when the power transmitting device is not in use, as a form of verification that sufficient lubricating oil will be available during use of the power transmitting device. Although not shown, it is well known in the power transmitting device art to include oil pumping means, for example, a positive displacement oil pump, for the supply of lubricating oil under pressure to various critical components of the power transmitting device. Lubricating oil may be supplied to the inlet of such a pump through an internal oil passage 18 which communicates with the lower region of the oil sump 14 to insure that lubricating oil will be available for the pumping action.

The filter system 10 includes a chamber 20 which is formed in the housing 12 to intersect the oil passage 18 at a portion thereof which is below the predetermined level 16 for the lubricating oil. In the preferred filter system 10, the chamber 20 is cylindrical and includes a tubular filter element 22 therein having screen and mesh wall materials to provide a reuseable means for entrapping undesired particles in the lubricating oil flowing therethrough.

The chamber 20 includes a threaded opening 26 in the housing 12 to allow access to the interior thereof. The opening 26 is above the predetermined lubricating oil level 16 so that installation and removal of the filter element 22 is possible without removal of the lubricating oil from the sump 14. Additionally and significantly, the opening 26 can be utilized to verify that the lubricating oil is at the predetermined level and provides an oil supply opening for the resupply of lubricating oil to the predetermined level if it is needed. A removable closure element 28 is threadedly received within the threaded opening 26 for sealing the opening 26 and retention of the filter 22 within the chamber 20. Specifically, the closure 28 has an internal recess 30 therein for retention of a spring 32 which provides downward biasing to the filter element 22 to cause it to be properly retained within the chamber 20.

During normal operation, the flow of lubricating oil will be from the oil sump 14 through the open end 34 of the tubular filter element 22 to cause the lubricating oil to be initially received within the interior of the filter element 22. A oil seal 36 is provided at the end 34 to make sealing contact with a portion of the housing 12 in this region so that lubricating oil would normally not be capable of flowing by the end 34 but instead would go into the interior of the filter element 22. Since the other end 37 of the filter element 22 is closed, the lubricating oil under suction at the oil passage 18 would then be caused to flow outwardly of the interior of the filter element 22 and pass through the filter media to remove undesired particles prior to its delivery to the inlet of the oil pump. Consequently, any undesired particles which are entrapped by the filter media will be maintained inside the filter element 22 and can be easily identified upon inspection of the filter element after it is removed from the chamber 20. Additionally, when the filter element 22 is removed for cleaning, the undesired particles will not as likely be dislodged and left in the lubricating oil in the region of the sump 14 as the filter element 22 might make contact with the edges of the opening 26.

To prevent the loss of lubricating oil to the oil pump if there is clogging of the filter media by an excess quantity of undesired particles, the biased arrangement for mounting the filter element 22 under the force of the spring 32 allows a bypass feature. For example, if there is sufficient resistance to flow through the filter media because of an excess quantity of undesired material entrapped thereby, the pressure created by the oil pump will be sufficient to act on the end 34 of the filter element 22 and cause it to be moved axially upward to unseat the seal 36 and allow lubricating oil to flow around the end 34 into the oil passage 18.

As thus described, the preferred filter system 10 provides reliable, effective filtering of lubricating oil to an oil pump of a power transmitting device and also serves as an access to the interior of the housing 12 for the supply of lubricating oil. As a result, the preferred filter system 10 has eliminated the need for an oil level inspection and supply port which has heretofore been typically required for such power transmitting devices. Therefore, the filter system 10 eliminates the manufacturing steps and the resulting expense required for providing an addition inspection and supply port. Additionally, with the filter being installed in the opening 26, the normal maintenance requirements for inspecting the level of the lubricating oil will results in a more convenient inspection of the filter to save maintenance time and to further insure that the filter is in a proper condition for the operation of the power transmitting device.

I claim:

1. A filter system for a power transmitting device of the type which includes a housing, an oil sump in a lower region of said housing for retaining a supply of lubricating oil which is to be maintained at a predetermined level when said power transmitting device is not in use, oil pumping means, and an internal oil passage from said oil sump to an inlet of said oil pumping means, said filter system including:

a chamber in said housing intersecting said oil passage to become a part thereof, said chamber being located at least partially below said predetermined level;

filter means removable installed in said chamber for filtering said lubricating oil flowing through said oil passage;

said chamber having an opening in said housing to allow access thereto, said opening being above said predetermined level to allow installation and removal of said filter means, verification of said lubricating oil at said predetermined level and supply of said lubricating oil to said predetermined level if needed; and removable means for sealed closure of said opening.

2. The filter system as set forth in claim 1, wherein said filter means is a tubular filter element and said chamber is generally cylindrical and extends downwardly into said housing from said opening.

3. The filter system as set forth in claim 2, wherein said lubricating oil flows into an open end of said filter element and outwardly through a tubular wall thereof.

* * * * *